(12) United States Patent
Canning et al.

(10) Patent No.: US 6,463,194 B1
(45) Date of Patent: Oct. 8, 2002

(54) NARROW TRANSMISSION BANDPASS FILTERS UTILIZING BRAGG GRATING ASSISTED MODE CONVERSION

(75) Inventors: John Canning, Carlton; Leon Poladian, Glebe, both of (AU)

(73) Assignee: The University of Sydney, Sydney (AU)

(*) Notice: Subject to any disclaimer, the term of this patent is extended or adjusted under 35 U.S.C. 154(b) by 0 days.

(21) Appl. No.: 09/446,616

(22) PCT Filed: Jun. 22, 1998

(86) PCT No.: PCT/AU98/00477

§ 371 (c)(1),
(2), (4) Date: Apr. 24, 2000

(87) PCT Pub. No.: WO99/00683

PCT Pub. Date: Jan. 7, 1999

(30) Foreign Application Priority Data

Jun. 27, 1997 (AU) .............................. PO 7614

(51) Int. Cl.⁷ .......................... G02B 6/10; G02B 6/14; G02B 6/18; G02B 6/26
(52) U.S. Cl. ....................................... 385/37; 385/147
(58) Field of Search ............................. 385/37, 43, 50, 385/147

(56) References Cited

U.S. PATENT DOCUMENTS

| | | | |
|---|---|---|---|
| 4,900,119 A | 2/1990 | Hill et al. | 350/96.15 |
| 5,283,686 A | 2/1994 | Huber | 359/337 |
| 5,305,336 A * | 4/1994 | Adar et al. | |
| 5,420,948 A | 5/1995 | Byron | 385/37 |
| 5,710,849 A | 1/1998 | Little et al. | 385/50 |
| 5,740,290 A | 4/1998 | Byron | 385/27 |
| 5,764,831 A | 6/1998 | Lauzon | 385/43 |

FOREIGN PATENT DOCUMENTS

| | | |
|---|---|---|
| EP | 0 234 828 | 9/1987 |
| EP | 0 383 627 A3 | 8/1990 |
| GB | 2 254 183 | 9/1992 |
| GB | 2 295 247 | 5/1996 |
| WO | 88/05614 | 7/1988 |
| WO | 89/03056 | 4/1989 |

* cited by examiner

Primary Examiner—Hung N. Ngo
(74) Attorney, Agent, or Firm—Foley & Lardner

(57) ABSTRACT

A method of creating an optical filter for selectively filtering an optical signal transmitted through the filter, the method comprising: constructing a Bragg grating in an optical element coupled to an optical path way for the transmission of the optical signal to suppress background radiation; and adjusting the coupling so as to produce a selective transmission spectrum in according with predetermined requirements.

16 Claims, 3 Drawing Sheets

NARROW TRANSMISSION BANDPASS FILTERS UTILIZING BRAGG GRATING ASSISTED MODE CONVERSION

FIELD OF THE INVENTION

The present invention relates to optical filtering techniques and in particular, in the preferred embodiment discloses utilising the filtering to produce a narrow transmission band pass filter.

BACKGROUND OF THE INVENTION

Fibre Bragg gratings are proving to be instrumental in enabling the introduction of WDM systems. They offer highly selective band reject filtering needed for the transmission of multiple closely spaced wavelengths. These gratings, however, tend to work in reflection modes only since the large k-vector allows coupling from forward travelling modes to backward travelling modes. This can be a major disadvantage since to utilise the reflection mode in transmission systems requires the use of optical recirculators.

Known gratings which operate using phase-matching in the forward direction tend to have long periods, determined by the beat length between two modes. Fundamental mode conversion normally requires stripping of the higher order mode to achieve a loss bandpass. This is more readily achieved when conversion is to cladding modes. Whilst these filters have very low reflections, they operate as loss filters and not transmission bandpass devices. Further, the loss bandwidth tends to be broad, on the order of 20 nm, because of the small differences in modal dispersion. The spectral response of these filters is a rejection notch in transmission which is much broader than that of a Bragg grating. On the other hand, grating dispersion has been used to achieve mode conversion in reflection over a small wavelength range. In all these cases transmission notch filters are generally produced, whereas in most cases the opposite—a transmission bandpass filter—is generally desired.

SUMMARY OF THE INVENTION

It is an object of at least preferred embodiments of the present invention to utilise a Bragg grating to achieve effective mode coupling in a manner which allows for a narrow transmission bandpass filter to be produced.

In accordance with a first aspect of the present invention there is provided a method of creating an optical filter for selectively filtering an optical signal transmitted through said filter, said method comprising constructing a Bragg grating in an optical waveguide, the waveguide being coupled to the optical signal for guiding the optical signal through the grating; and adjusting said coupling so as to produce a selective transmission spectrum of the optical filter in accordance with predetermined requirements.

In accordance with a second aspect of the present invention there is provided a method of creating an optical filter for selectively filtering an optical signal transmitted through said filter, said method comprising constructing a Bragg grating in an optical waveguide, the waveguide being coupled to the optical signal for guiding the optical signal through the grating, and optimising said coupling so as to transfer light from an input mode to a predetermined output mode in accordance with requirements.

Preferably said filter comprises a narrow transmission band pass filter and the optical filter can be constructed as a planar waveguide. One form of construction of the grating can be tapered.

In accordance with a third aspect of the present invention there is provided an optical transmission filter comprising:

a tapered Bragg grating, input coupling means for coupling light into one end of said grating;

output coupling means for coupling light out of said grating;

wherein the position of said input and output coupling means are adjust so as to produce one or more filter bandpass transmission peaks in accordance with predetermined requirements.

The filter can be utilized in cascade with other filter devices. The filter can further comprise a second output coupling means to couple light not coupled by the first output coupling means. The filter can be coupled with other optical elements including at least one of a phase shifting structure or a long period grating. Alternatively, the filter can be coupled with a non-linear optical element. The filter can also be utilized in a distributed feedback laser.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF THE PREFERRED AND OTHER EMBODIMENTS

In the preferred embodiment, a construction is provided which, it is theorized, takes advantage of the various resonances set up in a Bragg grating to couple light from one mode to another so as to produce desirable output results. In particular, an arrangement is constructed such that a backward travelling mode is able to be recoupled into a forward travelling mode at selective wavelengths so as to produce a bandpass filter in both reflection and transmission. The aforementioned principle can be utilised to couple light from one mode to another in a planar waveguide device or in an optical fibre device which can be selected to be lossy in all modes except the desired output mode.

One form of achieving loss for unwanted modes is to utilise a multi-mode tapered waveguide with single mode input and output fibres. Utilising such a waveguide, a transmission bandpass of approximately 1 nm wide with a 15 dB signal to noise ratio was obtained. As a result, the resonant properties of a Bragg grating can be utilised to generate narrow transmission bandwidth filters which have spectral widths determined in accordance with the dispersion bandwidth of the grating.

Figure 1:
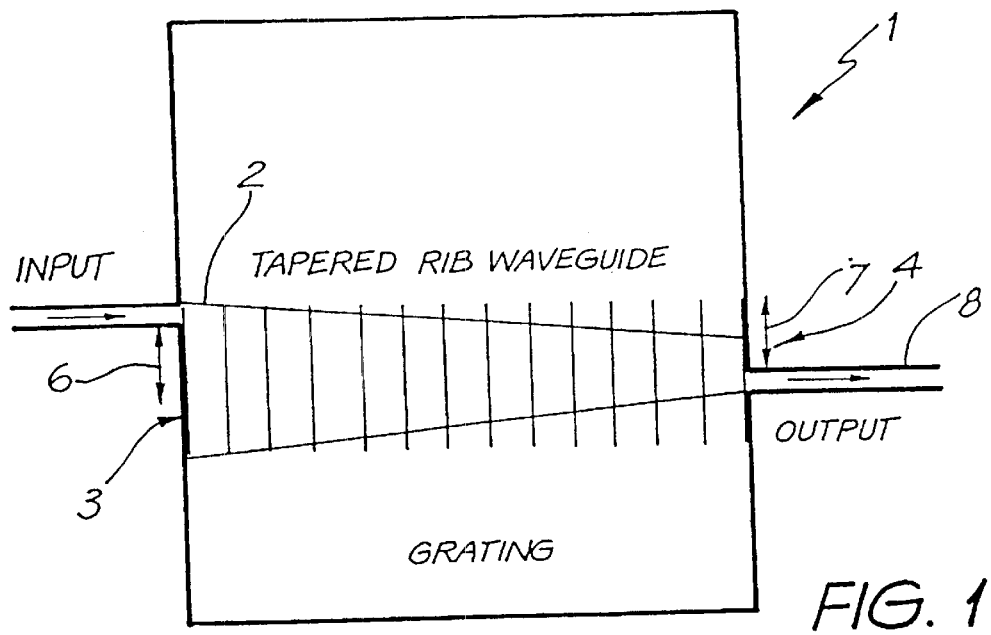
FIG. 1 illustrates schematically the arrangement of the preferred embodiment.

Turning to FIG. 1, there is illustrated 1 the construction of an embodiment of the invention. A germanosilicate (20%$GeO_2$) tapered rib waveguide 2 was fabricated utilizing PECVD material. The tapered waveguide was tapered from 1 mm wide at one end 3 to 10$\mu$ at the other end 4 and, as such, supported a large number of transmission modes.

The rib height was 0.5 μm and the length 1 cm. PECVD based glass was used because of the inherently high photosensitivity which allowed the fabrication of Bragg gratings having sensitivities well in excess of 35 dB. However, ribs made from this material can have a large birefringence splitting arising both from geometry and stress effects which are not easily compensated. Using the 193 nm output from an ArF laser, a Bragg grating was written across the taper length (fluence: 400 J/cm$^2$) resulting in several chirped grating peaks whose spectral position was dependent on the particular mode into which launched light was coupled.

FIG. 1 shows the setup used to obtain narrow bandpass peaks. By adjusting both the launch 6 and collection 7 ends, it was possible to couple into a lossy mode within the initial part of the taper which is not supported at the other end. Thus very little light would normally couple to the output. However, the grating is able to couple directly some of this light into a mode which is coupled out into the single-mode fibre. Those wavelengths which satisfy the phase matching condition, determined by the beat length between the modes, are efficiently coupled resulting in the generation of a highly dispersive narrow bandpass filter. This filtering was not able to be generated without the presence of a grating. If the waveguide were uniform, some modal interference, similar to that previously used as a fibre interferometer would be detected.

Figure 2:
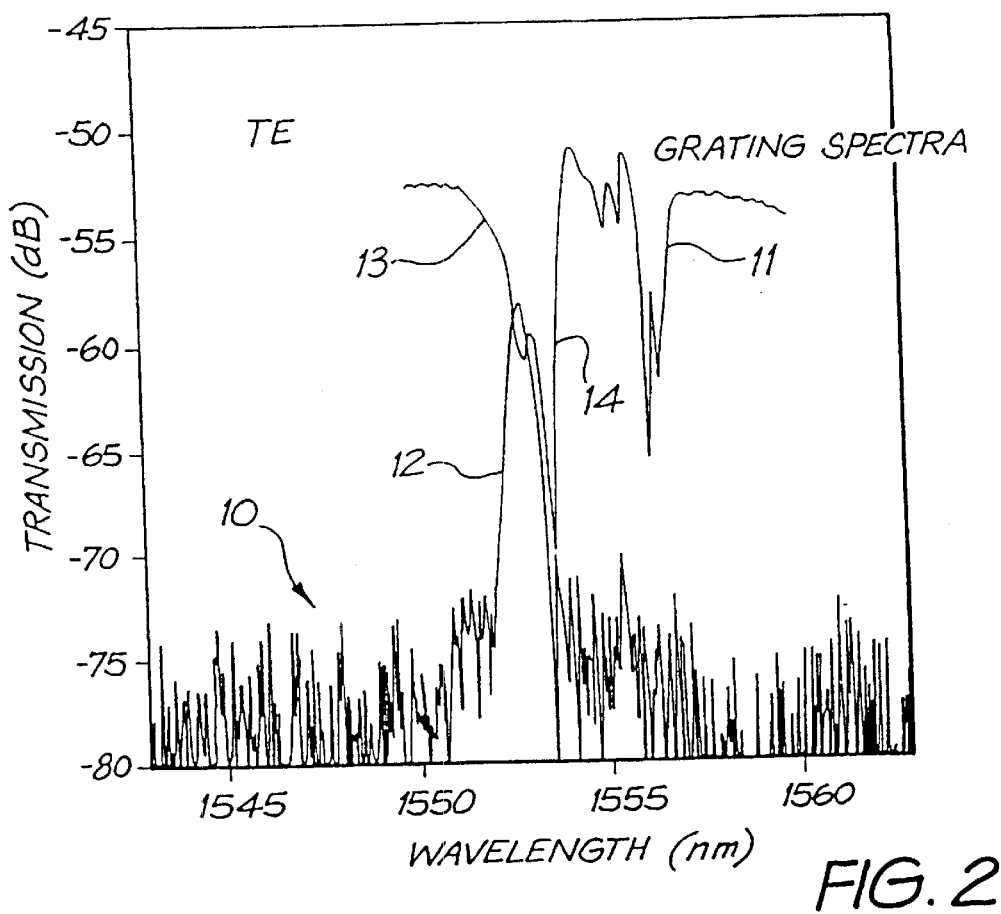
FIG. 2 illustrates the transmission spectrum and grating spectra of the preferred embodiment.
Figure 3A:
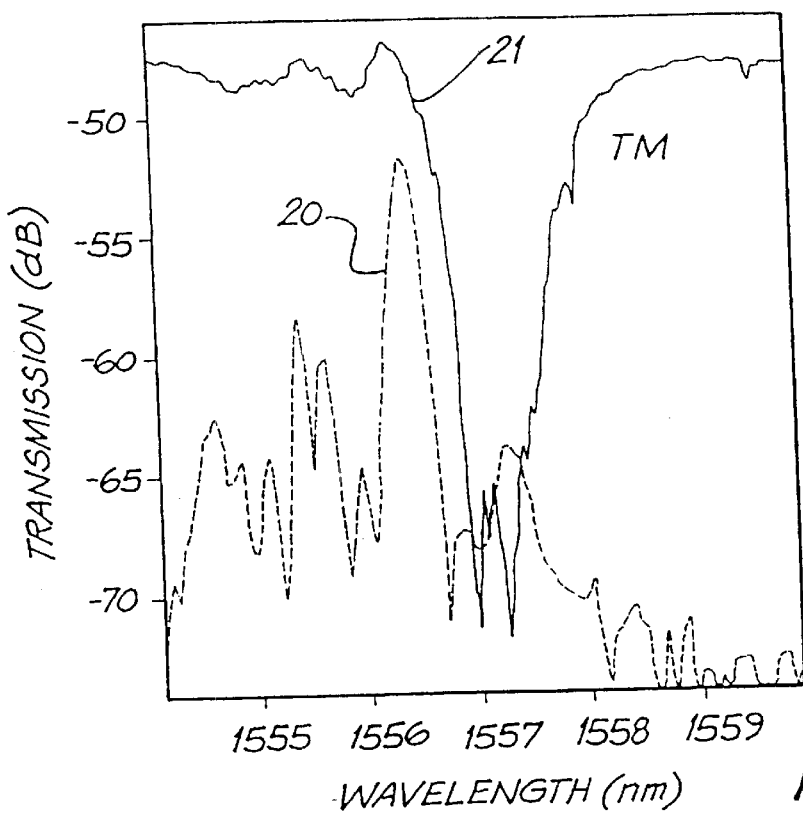
FIG. 3(a) to FIG. 3(c) illustrate various transmission spectrums for both polarised and unpolarised light for the apparatus of FIG. 1.
Figure 3B:
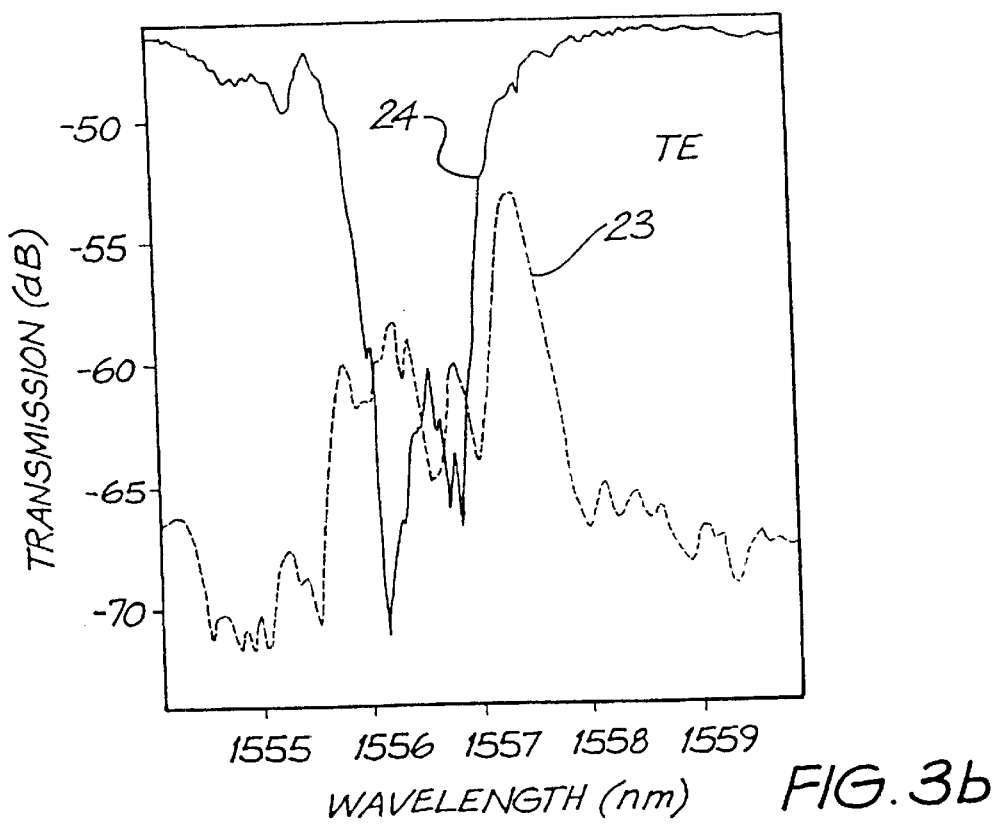
Figure 3C:
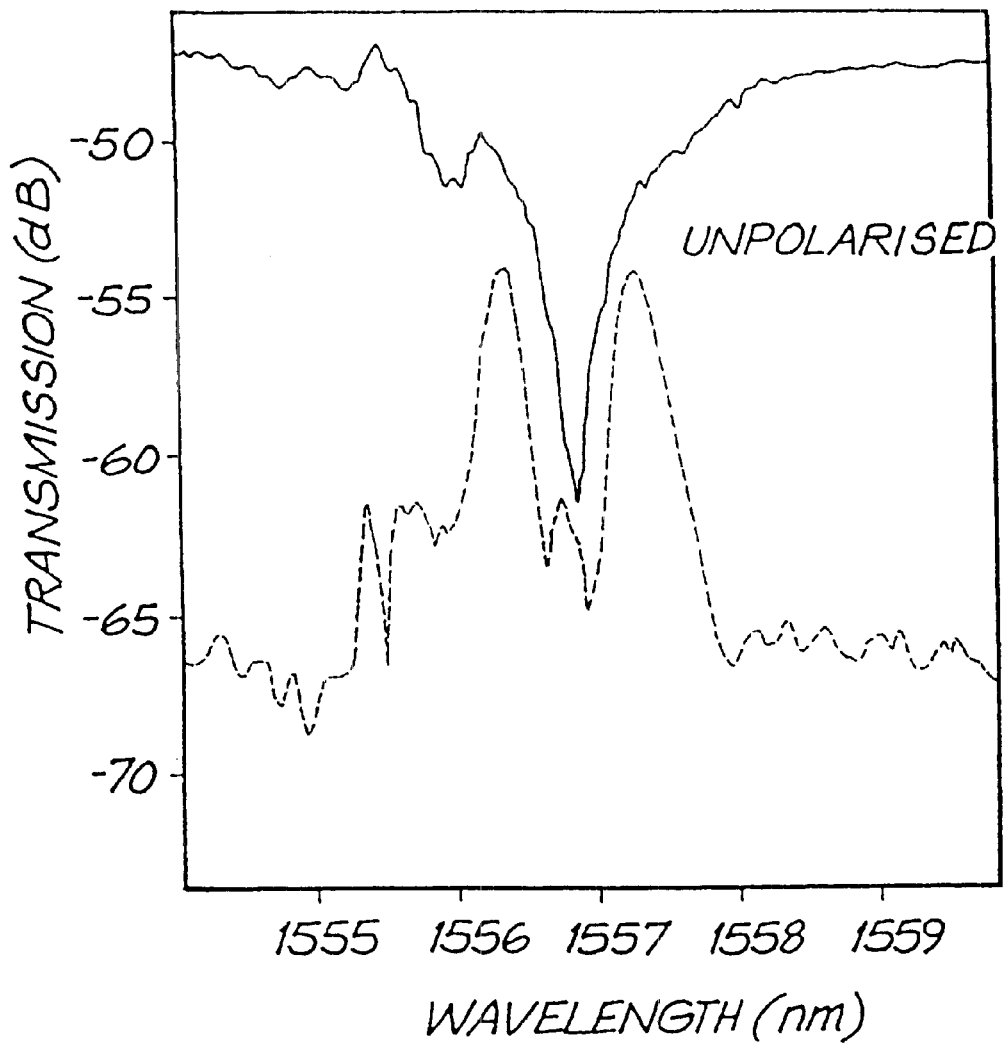

Light from an EDFA was polarised using two in-line polarisers and input to the setup. In FIG. 2, there is illustrated the resulting TE transmission spectrum 10 having a peak 12. Also shown is the corresponding grating spectrum 11 when the configuration is symmetric and the input light is coupled directly to the output fibre. The transmission peak 12 lies on one edge 13 in a notch in the grating spectra 11. By varying the input coupling positions, it was found possible to generate a similar peak on the other side 14 of the band gap while suppressing the peak 12. By adjusting the polarisation inputs, both TE (FIG. 3(a)) and TM (FIG. 3(b)) peaks were produced. In FIG. 3(a), the peak 20 was again on the sidewall 21 of a grating spectra notch, as was the TE case (FIG. 3(b)) where the peak 23 is on the opposite sidewall of the grating spectra notch. The position of the peaks eg. 20, 23 was found to be very much a function of the adjustment of input and output fibre couplings. The birefringence splitting, as determined by the peak separation of the transmission bands for TE and TM was approximately 1.2 nm.

Referring again to FIG. 2, the peak 12 was optimised for the grating of FIG. 1 when utilising TE light. The narrow bandpass of peak 12 was approximately 1 nm wide and the signal to noise level approximately 15 dB, over the measured range of 1530 nm to 1550 nm. Although the signal peak was found to be approximately 7 dB below the optimised background transmission signal, it is thought that this can be significantly improved by further optimisation of the waveguide shape and grating profile.

To determine if the coupling was dependant on the waveguide dimensions, the aforementioned analysis was repeated for several available tapers where one end width was fixed at 10 microns and the other end varied up to 1 mm. It was found that similar narrow transmission bands could be generated for the available tapers, the only difference being the effectiveness of the broadband dispersion of light coupling into the output fibre. As a general rule, it was found that the larger the taper the greater the loss of contrast between the launched and output modes, ensuring that very little of the launched mode was able to couple at the other end.

While not wishing to be bound by theory, it is thought that the above results indicate that the grating is able to provide for phase matching conditions in the forward and backward direction. The effective period for coupling appears to be determined by the number of cavity round trips in the grating which introduces a phase delay being somewhat proportional to a cavity quality factor "Q". Since the round trip includes both forward and backward travelling waves, variable phase matching in both the forward and reverse directions should be possible. Thus, it would be apparent that gratings, similar to that utilised, can act as a powerful variable delay elements by either tuning input wavelengths or by tuning the grating itself. Optimal results are often obtained by adjusting the input and output coupling. If the grating is uniform then coupling must occur between symmetric modes. Otherwise, an asymmetry is present either as a blaze in the grating or non-uniformity in the taper.

It will be evident that grating filters can be utilised to generate prechirped bandpass peaks in accordance with requirements and in particular those that take into account any fibre dispersion experienced later in a WDM system. This prechirp can be tailored by selecting which side of the grating coupling filtering is achieved so as to control the side of the dispersion and through optimising the grating chirp. Alternatively, some post dispersion compensation can be utilised at the other end of a WDM system. By generating and chirping signals simultaneously and optimising the transmission profile, the problem of utilising a grating dispersion compensator which is compatible with incoming signals is alleviated.

Improvements in background light suppression can be achieved by optimising the integrated waveguide shape or by using loss elements such as mode strippers or specially designed long period gratings similar to those used for gain flattening. Alternatively, such filters may be used to equalise a series of transmission peaks which cover the entire EDFA spectrum. In this case, sampled grating structures may be used to generate multiple peaks with close to equal spacings.

Another application of the principles of the preferred embodiment is as a polarisation converter. The coupling condition can be adjusted such that one polarisation state can be coupled into the other. The beat length being determined by the birefringence splitting. Further, polarisation mixing may be possible if there is incomplete power transfer.

Although the above principles are independent of the form of waveguide used, integrated optics may have distinct advantages including a greater ease of reproducibility on the one wafer as well as being more tolerant to environmental instabilities. Further, concatenation and parallel operation can be performed on the one packaged element. Alternatively optical fibre structures could be utilised.

Of course, the preferred embodiment can be readily extended to multiple structures having multiple incoming and outgoing guides and multiple operative optical elements utilized, for example, in a cascaded fashion. For example, the uncoupled output can be passed to one or more other tapered waveguides and consequently the uncoupled light can be processed through another taper device to repeat the process. Clearly this can be extended to a cascade of devices to or a multi-moded interference device with multiple outputs. The overall device function can be optimized through tailoring either or both of the guide profiles (eg. by utilizing a multiple interference region) and the grating profiles of each tapered device (eg. by utilization of particular chirping profile or using sample gratings).

Other structures can be utilized in a complex device including phase shifted structures and long period gratings. Further functionality can included the addition of a non-linear element into the complex device. Examples of non-linear devices can include erbium doped fibre, thermal heating, pulse intensity driven index changes or electro-optic effects. The resultant complex device can provide an active structure which may be used to switch across ports by adjusting the required coupling length for each port in a multi output device. Further, fast or slow switching systems can be achieved depending on the non-linear processes employed. Further, the tapered device can be utilized to form a novel laser device. For example, an Erbium doped device can provide for distributed feedback lazing on multiple different lines simultaneously in space across different parts of a multimode region with the output being provided at different output ports. Obviously, many other complex devices can be realized utilizing the tapered waveguide having an internal Bragg grating as a core element.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

We claim:

1. A method of creating an optical filter for selectively filtering an optical signal transmitted through said filter, said method comprising:

constructing a Bragg grating in an optical waveguide, the waveguide being coupled to the optical signal for guiding the optical signal through the grating; and adjusting said coupling so as to produce a selective transmission spectrum of the optical filter in accordance with predetermined requirements.

2. A method of creating an optical filter for selectively filtering an optical signal transmitted through said filter, said method comprising:

constructing a Bragg grating in an optical waveguide, the waveguide being coupled to the optical signal for guiding the optical signal through the grating, and optimising said coupling so as to transfer light from an input mode to a predetermined output mode in accordance with requirements.

3. A method as claimed in claim 1 wherein said filter comprises a narrow transmission band pass filter.

4. A method as claimed in claim 1 wherein said optical filter is constructed as a planar waveguide.

5. A method as claimed in claim 1 wherein said optical filter is constructed within an optical fibre.

6. A method of creating an optical filter for selectively filtering an optical signal transmitted through said filter, said method comprising:

constructing a Bragg grating in an optical waveguide, the waveguide being coupled to the optical signal for guiding the optical signal through the grating; and adjusting said coupling so as to produce a selective transmission spectrum of the optical filter in accordance with predetermined requirements, wherein said Bragg grating is tapered.

7. An optical transmission filter comprising:

a tapered waveguide having a Bragg grating formed therein, input coupling means for coupling light into one end of said grating;

first output coupling means for coupling light out of said grating;

wherein the position of said input coupling means and said output coupling means are adjusted so as to produce one or more filter bandpass transmission peaks in accordance with predetermined requirements.

8. An optical transmission filter as claimed in claim 7, wherein said input coupling means is interconnected to a wide end of said taper and said output coupling means is connected to a narrow end of said taper.

9. An optical transmission filter as claimed in claim 7, wherein said tapered Bragg grating is formed in a planar optical waveguide.

10. An optical transmission filter as claimed in claim 7, wherein said tapered Bragg grating is formed in an optical fibre.

11. An optical transmission filter as claimed in claim 7, wherein said filter is utilized in cascade with other filter devices.

12. An optical transmission filter as claimed in claim 11, wherein said filter further comprises a second output coupling means to couple light not coupled by said first output coupling means.

13. An optical transmission filter as claimed in claim 7, wherein said filter is coupled with other optical elements including at least one of a phase shifting structure or a long period grating.

14. An optical transmission filter as claimed in claim 11, wherein said filter is coupled with a non-linear optical element.

15. An optical transmission filter as claimed in claim 7, wherein said filter is utilized in a distributed feedback laser.

16. An optical transmission filter as claimed in claim 7, wherein said input coupling means is located a narrow end of said taper and said output coupling means is located at a wide end of said taper.

* * * * *